United States Patent [19]

Mitsuno et al.

[11] Patent Number: 4,521,487

[45] Date of Patent: Jun. 4, 1985

[54] PARTICULATE POLYOLEFIN EXPANSION MOLDING MATERIAL

[75] Inventors: Tatsuyuki Mitsuno; Masashi Yamamoto, both of Chiba, Japan

[73] Assignee: Sumitomo Chemical Company, Limited, Japan

[21] Appl. No.: 652,994

[22] Filed: Sep. 21, 1984

[30] Foreign Application Priority Data

Sep. 21, 1983 [JP] Japan .................. 58-175487

[51] Int. Cl.$^3$ .............................. C08J 9/16
[52] U.S. Cl. .................... 428/407; 427/222; 521/57; 521/59
[58] Field of Search .......... 521/57, 59; 427/222; 428/407

[56] References Cited

U.S. PATENT DOCUMENTS

| | | | |
|---|---|---|---|
| 4,110,273 | 8/1978 | Cobneu et al. | 521/59 |
| 4,331,776 | 5/1982 | Gazonnet | 521/138 |
| 4,433,029 | 2/1984 | Senda et al. | 521/59 |
| 4,463,032 | 7/1984 | Arudt et al. | 521/59 |

Primary Examiner—Morton Foelak
Attorney, Agent, or Firm—Sughrue, Mion, Zinn, Macpeak and Seas

[57] ABSTRACT

A particulate polyolefin expansion molding material is disclosed. The material is comprised of a particulate polyolefin having a bulk density of 0.45 g/cc or more and a mean particle size of 150 to 2,000$\mu$, having provided on the surface thereof at least one layer comprising an expanding agent, a binder and a filler. The material can be used in producing expansion molded articles without first forming the material into pellets as is conventionally done.

6 Claims, No Drawings

PARTICULATE POLYOLEFIN EXPANSION MOLDING MATERIAL

FIELD OF THE INVENTION

This invention relates to a particulate polyolefin expansion molding material, which is covered with a layer containing an expanding agent, a binder and a filler.

BACKGROUND OF THE INVENTION

Conventional techniques for expansion molding of polyolefins involve a method using a chemical expanding agent of thermal decomposition type, a method for molding polyolefins by impregnating hydrocarbons having a low boiling point with polyolefins, a method for extrusion molding of polyolefins while introducing an inert gas into an extruder, etc. The present invention is directed to polyolefin expansion molding materials using a chemical expanding agent of thermal decomposition type.

In expansion molding of polyolefins using a chemical expanding agent of thermal decomposition type, a given amount of an expanding agent is incorporated into the polyolefins; however, the expanding agent is finely divided and has a low bulk density and accordingly, mere mixing with particulate polyolefins results in the following disadvantages:

(1) Finely divided expanding agents scatter upon charging the expanding agents into a hopper or transfer of the expanding agents from a storage tank to a hopper.

(2) Such a mixture is poor in feeding with a screw of a molding machine so that a time period for plasticization is prolonged and moldability is lowered.

(3) Due to non-uniform dispersion of the expanding agent in a molten, plasticized product, the expansion of moldings is non-uniform so that uniform moldings are not obtained, etc.

As methods for improving these disadvantages, there are a method which comprises previously kneading an expanding agent into a polyolefin at temperatures lower than the decomposition temperature of the expanding agent and a method which comprises converting an expanding agent into a master batch and incorporating the master batch into a polyolefin. However, these methods which involve pelletization once limit usable expanding agents depending upon the melting points of a polyolefin and resins used in the master batch. In addition, much energy is required for the pelletization.

As a result of investigations on polyolefin materials suited for expansion molding requiring no pelletization step, eliminating the foregoing disadvantages (1) to (3) and capable of facilitating direct expansion molding, the present inventors have found that materials obtained by adhering an expanding agent onto the surface of a particulate polyolefin using a binder can attain such objects and have accomplished the present invention.

SUMMARY OF THE INVENTION

An object of the present invention is to provide a particulate polyolefin expansion molding material comprising a particulate polyolefin having a bulk density of 0.45 g/cc or more and a mean particle size of 150 to 2,000$\mu$, having provided on the surface thereof at least one layer comprising an expanding agent, a binder and a filler.

The particulate polyolefin expansion molding material of the present invention comprises respective polyolefin particles as nuclei, having firmly adhered an expanding agent and a filler with a binder onto the surface thereof. Therefore, the polyolefin material of the present invention provides a high bulk density and good fluidity and enables to subject to direct molding processing. Further, the molded article obtained using such materials exerts good dispersion of the expanding agent and the filler so that expansion molded articles having uniform outer appearance can be obtained. In addition, the use of binders having a melting point lower than the decomposition temperature of expanding agents also enables to use of expanding agents having a lower decomposition temperature. The present invention will be described in more detail hereinafter.

DETAILED DESCRIPTION OF THE INVENTION

The particulate polyolefin used in the present invention is a homopolymer of ethylene or propylene, a random copolymer or block copolymer of ethylene and another $\alpha$-olefin or of propylene and another $\alpha$-olefin, or the like. The crystalline polyolefin having a bulk density of 0.45 g/cc or more and a mean particle size of 150 to 2,000$\mu$ is preferable. If the bulk density is less than 0.45 g/cc, voids are formed inside and between the particles to such an extent that complete deaeration upon molding cannot be conducted. Therefore, the use of a polymer having a bulk density of less than 0.45 g/cc is not preferable. If the particle size is too small, the particles are blown off by air currents. Furthermore, if the particle size is 100$\mu$ or less, there is an additional danger of dust explosion. Because of these problems it is not desirable to make the particles too small. However, if the particles are too large, the dispersion of the expanding agent and filler deteriorates in resulting molded articles.

The more spherical the particles and the more narrow the particle size distribution, the more preferable. Properties of the particulate polyolefin are fundamentally determined by the polymerization catalyst used for its production.

A process for producing a polymer containing propylene as a major component is illustrated below as an example of obtaining polyolefin having preferable properties suited for the present invention. The polymer is obtained by polymerizing propylene or both propylene and another olefin using a catalyst system in the presence of an inert solvent, or in the substantial absence of an inert solvent, that is, in an excess liquid propylene or in gas phase. The catalyst system is comprised of a titanium trichloride composition prepared by reducing titanium tetrachloride with an organoaluminum compound and activating the reduced product, an organoaluminum compound and, if necessary, an electron donative compound.

Specific examples of processes for preparing the titanium trichloride composition are disclosed in a number of publications such as Japanese Patent Application (OPI) Nos. 34478/72, 76196/76, 33289,78, 112973/79, 119576/79, 11985/79, etc. (The term "OPI" as used herein refers to a "published unexamined Japanese patent application", hereinafter the same.)

The term "expanding agent" as used herein refers to a compound which is a solid at room temperature and, when heated at temperatures higher than the decomposition temperature thereof, generates gases such as nitrogen, carbon dioxide, ammonia gas, etc. For example, there can be employed known organic or inorganic expanding agents such as dinitrosopentamethylenetetramine, azodicarbonamide, metal salts of azodicarbonamide, 4,4'-oxybis(benzenesulfonylhydrazide), toluenesulfonylhydrazide, sodium bicarbonate, ammonium carbonate, etc. Further, these expanding agents may be employed singly or in combination of two or more. These expanding agents may also be employed in combination with known expansion aids such as urea, urea type compounds, zinc flower, zinc stearate, etc. The amount of the expanding agent to be used is generally in the range of from 0.1 to 20 parts by weight per 100 parts by weight of the particulate polyolefin used, but may be appropriately varied depending upon the desired expansion magnification, method for molding, kind of expanding agent used and the volume of gases generated. When the amount of the expanding agent used is smaller than the foregoing lower limit, the expansion magnification is too low, while exceeding the foregoing upper limit results in excess generation of gases due to decomposition of the expanding agent so that the expanding agent fails to resist the viscosity of resin, cracking is caused in the expanded article and gas dissipates outside to cause shrinkage.

The term "filler" as used herein refers to a compound conventionally incorporated for the purposes of improving physical properties, etc., of polyolefins. Examples of useful fillers include inorganic fillers such as silica, diatomaceous earth, alumina, titanium oxide, iron oxide, zinc oxide, magnesium oxide, pumice powder, aluminum hydroxide, magnesium hydroxide, calcium carbonate, magnesium carbonate, calcium sulfate, barium sulfate, talc, clay, mica, glass beads, carbon black, etc., and mixtures of two or more thereof. The size of the filler particles is not particularly limited, but is usually $50\mu$ or less, preferably $30\mu$ or less. The smaller the particle size of the particulate polyolefin nuclei, the finer the filler particles should be.

The amount of the filler to be used is generally in the range of from 0.1 to 150 parts by weight, preferably from 10 to 150 parts by weight, per 100 parts by weight of the particulate polyolefin.

The binder of the present invention acts to firmly adhere the expanding agent and the inorganic filler onto the surface of the particulate polyolefin. In view of the quality of the molded articles, it is preferred to use the binder having good compatibility with the particulate polyolefin. Examples of the binder include olefinic polymers such as polyethylene, ethylene-vinyl acetate copolymer, ethylene-unsaturated carboxylic acid ester copolymer (e.g., ethylene-methyl methacrylate copolymer, etc.), ethylene-unsaturated carboxylic acid metal salt copolymer (e.g., ethylene-magnesium or zinc acrylate copolymer, etc.), copolymer between propylene and other olefin (e.g., propylene-ethylene copolymer, propylene-butene-1 copolymer, etc.), polyethylene or polypropylene modified with unsaturated carboxylic acid such as maleic anhydride, ethylene-propylene rubber, ethylene-butene-1 rubber, atactic polypropylene, etc.; petroleum resins; polyalkylene glycols such as polyethylene glycol and polypropylene glycol; and the like. Particularly preferred are olefinic polymers such as polyethylene, ethylene-vinyl acetate copolymer, ethylene-unsaturated carboxylic acid ester copolymer (e.g., ethylene-methyl methacrylate copolymer, etc.), ethylene-unsaturated carboxylic acid metal salt copolymer (e.g., ethylene-magnesium or zinc acrylate copolymer, etc.), copolymer between propylene and other olefin (e.g., propylene-ethylene copolymer, propylene-butene-1 copolymer, etc.), polyethylene or polypropylene modified with unsaturated carboxylic acid such as maleic anhydride, ethylene-propylene rubber, ethylene-butene-1 rubber, atactic polypropylene, etc.

In general, moldings of filler-containing polyolefin has higher rigidity and lower impact strength than those of filler-free moldings. On the other hand, the use of olefinic polymer as a binder in the particulate polyolefin molding material of the present invention prevents the deterioration of, or improves, the impact strength, thus being preferable. For example, when using particulate polypropylene, it is preferable to use polyethylene, propylene-butene-1 copolymer, ethylene-propylene rubber, ethylene-butene-1 rubber, atactic polypropylene, etc., as a binder due to the improved impact strength. These binders may be used alone or in combination.

The amount of binder to be used varies depending upon the kinds and amounts of the expanding agent and filler used, and may properly be determined in view of these factors. The weight ratio of binder/(filler+expanding agent) is usually about 1/10 to about ½, preferably about 1/10 to about ¼.

To further improve the physical properties of the particulate polyolefin expansion molding material of the present invention, various antioxidants, light stabilizers and pigments which are conventionally incorporated for the purposes of improving the stability and quality of polyolefins may also be employed. The amount of these additives to be compounded may be suitably determined, taking the amount adhered into account. However, the addition amount is generally smaller than that of the filler and therefore, the amount of the binder may be larger than that of the compounding additives. Examples of useful stabilizers include antioxidants such as 2,6-di-t-butyl-p-cresol, calcium stearate, tetra[methylene-3-(3,5-di-t-butyl-4-hydroxyphenyl)propionate]methane, etc., and light stabilizers such as 2-(2'-hydroxy-5'-methylphenyl)benzotriazole, 2-hydroxy-4-octylbenzophenone, etc., but the stabilizers are not limited thereto. As pigments, organic or inorganic pigments that are used for coloration of polyolefins can be used.

One example of the process of the present invention for producing a particulate polyolefin expansion molding material is described below.

A jacketed mixer is used. The mixer is equipped with a stirrer and can heat the content. For example, it is possible to use a Henschel mixer, a Super Mixer (trade name; made by Kawata Mfg. Co.), or the like. A particulate polyolefin, an expanding agent, an inorganic filler, a binder, and, if desired, various compounding additives are heated therein to a temperature a little higher than the melting point of the binder under mixing. Thus, the molten binder strongly and uniformly adheres on the surface of the particulate polyolefin while including the expanding agent, inorganic filler and various compounding additives. The content is taken out directly or after it is cooled to some extent to obtain a particulate polyolefin molding material having good fluidity. In producing the molding material in the above-described manner, it is preferred that the binder is in the molten state at temperatures lower than the melting point of the particulate polyolefin by at least 3° C. and lower than the decomposition temperature of the expanding agent by at least 5° C. in order to prevent the particulate polyolefin from melting as well as to prevent the expanding agent from decomposition inside the mixer.

In addition, it is suited that the shape of the binder be small as possible for the purposes of well dispersing the filler and the expanding agent and melting the binder in a short period of time. Taking polyethylene as an example of the binder, the filler and the expanding agent can be uniformly dispersed and adhered in a short period of time by the use of pellets obtained by extrusion granulation after pulverizing and passing through a 30 mesh sieve, rather than by the use of such pellets as they are. The molding materials of the present invention are provided for conventionally known injection molding or extrusion molding without pelletization.

Hereafter, the present invention will be described in more detail with reference to the examples below but is not limited thereto.

EXAMPLE 1

(1) Polymerization of Propylene:

The atmosphere in a stainless steel-made, stirring type autoclave having an inside volume of 3,000 liters was replaced with nitrogen. Then, 1,800 g of diethylaluminum chloride and 50 g of titanium trichloride solid catalyst (B) obtained by the process shown in Japanese Patent Application (OPI) No. 33289/78, Example 15, catalyst preparation 3 were charged in the autoclave, and hydrogen was introduced thereinto in an amount corresponding to a partial pressure of 0.5 kg/cm$^2$.

Then, 840 kg of liquid propylene was pressed into the autoclave, and the autoclave was kept at 65° C. for 4 hours to polymerize.

After completion of the polymerization, unreacted monomer was purged, and 60 liters of methanol was added thereto to decompose the catalyst. The thus-produced polypropylene was collected by centrifugation and dried at 60° C. under reduced pressure to obtain 390 kg of spherical particulate polypropylene having a uniform particle size. The melting point of this polypropylene was measured on a differential scanning calorimeter (made by Perkin-Elmer) was found to be 165° C.

This particulate polypropylene had a mean particle size of about 600$\mu$ and a bulk density of about 0.49 g/cc.

(2) Production of Molding Material:

A 2 kg/cm$^2$G steam was introduced into a jacket of a 100 l Super Mixer (trade name; made by Kawata Mfg. Co.). Then, 17.5 kg of the particulate polypropylene obtained in propylene polymerization (1), 0.5 kg of 30 mesh sieve-passing powder of SUMIKATHENE G801 ® (low density polyethylene; m.p.: 110° C.; made by Sumitomo Chemical Co., Ltd.) (as a binder), 0.4 kg of Cellmic CAP ® (decomposition temperature: 125° C., made by Sankyo Kasei Co., Ltd.) (azodicarbonamide-type expanding agent), 2.0 kg of talc (mean particle size: 8$\mu$) (as an inorganic filler), and 80 g of a stabilizer [tert-butyl-p-cresol: tetra[methylene-3-(3,5-di-t-butyl-4-hydroxyphenyl)propionate]methane = 2:1 by weight] were thrown into the mixer and stirred at 675 rpm.

The stirring was stopped 12 minutes after initiation of the stirring when the temperature of the mixture rose to 115° C., and the content was withdrawn from the mixer to obtain a spherical, free-flowing, molding material. The expanding agent, talc and stabilizer uniformly and strongly adhered so much to the particulate polypropylene that separation of the expanding agent, talc and stabilizer was not found even when the molding material was strongly rubbed by one's hand with a finger. Almost no adhesion was observed on the inside wall of the mixer.

(3) Molding:

Molding of the molding material was conducted by forming a flat plate of 100×400×3t using an injection molding machine (Netstal, made by Sumitomo Juki Co., Ltd., 13 ounces) under the conditions of a resin temperature at 220° C., a screw revolution number of 85 rpm, an injection pressure of 900 kg/cm$^2$, a back pressure of 50 kg/cm$^2$, an injection cycle (injection/cooling) = 15/30 seconds, a flow control valve opening degree of 178 and a mold temperature at 50° C. The feeding into the screw was good and no bridging phenomenon occurred. An expansion molded plate having uniform and fine foams was thus obtained.

EXAMPLE 2

The same procedure as in Example 1-(2) was conducted using the particulate polypropylene obtained in Example 1-(1) except that calcium carbonate having a mean particle size of 2 microns was used in place of talc. A molding material having properties simular to those in Example 1 was obtained. Separation of calcium carbonate, expanding agent and stabilizer was not found. The properties of the molding material are shown in Table 1.

Molding:

This molding material was molded under the same conditions as in Example 1-(3). The results are shown in Table 1.

EXAMPLE 3

(1) Compounding:

A molding material was prepared in a manner similar to that in Example 1-(2) except that Cellmic C ® (decomposition temperature: 200° C., made by Sankyo Kasei Co., Ltd.) (azodicarbonamide-type expanding agent) and atactic polypropylene (as a binder) which did not have a definite melting point but was in the molten state at about 120° C. were used. Twenty minutes after initiation of the stirring, the temperature reached 135° C. The content was withdrawn from the mixer to obtain a polypropylene material having good properties. The results are shown in Table 1.

(2) Molding:

This molding material was molded under the same conditions as in Example 1-(3). The results are shown in Table 1.

EXAMPLE 4

(1) Production of Molding Material:

A molding material was prepared in a manner similar to that in Example 1-(2) except that, in the compounded composition of Example 1, 1.5 parts by weight of, as a coloring pigment, a dry color composed of 50 parts of carbon black and 50 parts of calcium stearate was added to 100 parts by weight of a mixture of the particulate polypropylene and talc as a filler. Twelve minutes after initiation of the stirring, the temperature reached 115° C. The content was withdrawn from the mixer to obtain a uniformly colored, spherical, free-flowing molding material. The expanding agent, talc and pigment were uniformly and strongly adhered so much to the particulate polypropylene that separation of the expanding agent, talc and pigment was not found even when the molding material was strongly rubbed by one's hand with a finger.

(2) Molding:

This molding material was molded under the same conditions as in Example 1-(3). The results are shown in Table 1.

EXAMPLE 5

(1) Production of Molding Material:

A molding material was prepared in a manner similar to that in Example 1-(2) except that 12.5 kg of the particulate polypropylene obtained in Example 1-(1), 1.2 kg of 30-mesh sieve-passing powder of SUMIKATHENE G801 ® (as a binder), 6.0 kg of talc and 0.5 kg of Cellmic CAP ® (as an expanding agent) were used.

(2) Molding:

This molding material was molded under the same conditions as in Example 1-(3). The results are shown in Table 1.

COMPARATIVE EXAMPLE 1

(1) Production of Molding Material:

The same procedure as in Example 1-(2) was repeated except that no binder was used. Only a liberated talc-rich molding material was obtained. The talc, expanding agent and stabilizer were partly adhered to the particulate polypropylene but the compounding additives were stripped off merely by lightly rubbing by one's hand with a finger.

(2) Molding:

This molding material was molded under the same conditions as in Example 1-(3). As the result, dusts frequently generated upon the molding. Further, feeding into a screw was poor and surging occurred frequently. Expansion was non-uniform and depending upon location, a molded article haing large voids and thus having poor outer appearance was obtained.

COMPARATIVE EXAMPLE 2

The production and molding of a molding material were conducted in a manner similar to that in Example 4 except that no binder was used. As the result, the liberated talc-, expanding agent- and pigment-rich material was obtained as in Comparative Example 1. Only a molded article having uneven coloration, non-uniform expansion and poor outer appearance was obtained.

TABLE 1

|  | Example No. 1 | 2 | 3 | 4 | 5 | Comparative Example No. 1 | 2 |
|---|---|---|---|---|---|---|---|
| Particulate Polyethylene | Polypropylene | Polypropylene | Polypropylene | Polypropylene | Polypropylene | Polypropylene | Polypropylene |
| Binder | SUMIKATHENE G801 ® powder | SUMIKATHENE G801 ® powder | Atactic polypropylene | SUMIKATHENE G801 ® powder | SUMIKATHENE G801 ® powder | / | / |
| Foaming Agent | Cellmic CAP ® | Cellmic CAP ® | Cellmic C ® | Cellmic CAP ® | Cellmic CAP ® | Cellmic CAP ® | Cellmic CAP ® |
| Inorganic Filler | Talc | Calcium carbonate | Talc | Talc | Talc | Talc | Talc |
| Compounding Additive | Stabilizer | Stabilizer | Stabilizer | Stabilizer pigment | Stabilizer | Stabilizer | Stabilizer pigment |
| Moldability: | | | | | | | |
| Dust | Negative | Negative | Negative | Negative | Negative | Positive | Positive |
| Fluidity (bridging) | Good | Good | Good | Good | Good | Poor | Poor |
| Feeding into Screw | Good | Good | Good | Good | Good | Good | Good |
| Surging | Negative | Negative | Negative | Negative | Negative | Positive | Positive |
| Shape of Molding: | | | | | | | |
| Expansion Properties | Fine, Good | Fine, Good | Fine, Good | Fine, Good | Fine, Good | Non-uniform | Non-uniform |
| Perforation[1] | A | A | A | A | A | C | C |
| Unevenness in Coloration | — | — | — | Good | — | — | Poor |

Note[1]:
State of possible perforation on a flat plate of 100 × 400 × 3t was classified into the following 3 ranks for evaluation:
A: No perforation,
B: 3 to 5 perforations,
C: More than 6 perforations While the invention has been described in detail and with reference to specific embodiments thereof, it will be apparent to one skilled in the art that various changes and modifications can be made therein without departing from the spirit and scope thereof.

What is claimed is:

1. A particulate polyolefin expansion molding material comprising a particulate polyolefin having a bulk density of 0.45 g/cc or more and a mean particle size of 150 to 2,000μ, said particles having coated on the surface thereof at least one layer comprising a solid decomposable expanding agent, a binder selected from the group consisting of olefinic polymers, petroleum resins and polyalkylene glycols and a filler.

2. A particulate polyolefin expansion molding material as claimed in claim 1, wherein said binder is in the molten state at a temperature lower than the melting point of said particulate polyolefin by at least 3° C.

3. A particulate polyolefin expansion molding material as claimed in claim 1, wherein said particulate polyolefin is a crystalline propylene homopolymer or copolymer.

4. A particulate polyolefin expansion molding material as claimed in claim 1, wherein said binder is in the molten state at a temperature lower than the decomposition temperature of said expanding agent by at least 5° C.

5. A particulate polyolefin expansion molding material as claimed in claim 1, wherein the amount of said expanding agent is 0.1 to 20 parts by weight per 100 parts by weight of said particulate polyolefin.

6. A particulate polyolefin expansion molding material as claimed in claim 1, wherein the amount of said filler is 0.1 to 150 parts by weight per 100 parts by weight of said particulate polyolefin.

* * * * *